(12) United States Patent
Lesage et al.

(10) Patent No.: US 10,807,057 B2
(45) Date of Patent: Oct. 20, 2020

(54) FCC UNIT CHARGE INJECTION DEVICE WITH LIMITED PRESSURE DROP

(71) Applicant: Total Raffinage Chimie, Courbevoie (FR)

(72) Inventors: Romain Lesage, Antwerp (BE); Sebastien Decker, Octeville sur Mer (FR); Jean-Christophe Raboin, Chaumont sur Tharonne (FR); Youen Kerneur, Le Havre (FR)

(73) Assignee: Total Raffinage Chimie, Courbevoie (BE)

( * ) Notice: Subject to any disclaimer, the term of this patent is extended or adjusted under 35 U.S.C. 154(b) by 0 days.

(21) Appl. No.: 16/496,862

(22) PCT Filed: Mar. 22, 2018

(86) PCT No.: PCT/EP2018/057340
§ 371 (c)(1),
(2) Date: Sep. 23, 2019

(87) PCT Pub. No.: WO2018/172473
PCT Pub. Date: Sep. 27, 2018

(65) Prior Publication Data
US 2020/0101430 A1      Apr. 2, 2020

(30) Foreign Application Priority Data
Mar. 24, 2017 (FR) .................................... 17 52496

(51) Int. Cl.
*B01J 4/00* (2006.01)
*B01J 8/18* (2006.01)
(Continued)

(52) U.S. Cl.
CPC ............. *B01J 4/002* (2013.01); *B01J 8/1827* (2013.01); *B05B 7/0483* (2013.01); *C10G 11/18* (2013.01); *B01J 2208/00902* (2013.01)

(58) Field of Classification Search
CPC .. B01J 4/002; B01J 4/005; B01J 2208/00902; B01J 19/26; B05B 7/0483; B05B 7/0491; B05B 7/0416; B05B 7/0408
See application file for complete search history.

(56) References Cited

U.S. PATENT DOCUMENTS 1,197,600 A  *  9/1916  Brown .................. B05B 7/0475
                                                 239/427
3,301,485 A  *  1/1967  Tropeano .................. F25C 3/04
                                                 239/2.2
(Continued)

FOREIGN PATENT DOCUMENTS

FR      3020578 A1      11/2015
WO      0114500 A1      3/2001
(Continued)

OTHER PUBLICATIONS

International Search Report issued in Application No. PCT/EP2018/057340, dated Jun. 22, 2018, 7 pages.
(Continued)

*Primary Examiner* — Lessanework Seifu
(74) *Attorney, Agent, or Firm* — Albert Shung

(57) ABSTRACT

The invention relates to an injection device (10) configured to atomize a liquid into droplets using a gas, comprising a hollow tubular body (12) of longitudinal direction (X). An internal wall (13) defines a first zone referred to as a contact zone (Z1) and a second zone (Z2). The body has:
  at least a first and a second inlet opening (14; 16) opening into the said first zone (Z1), so as to respectively inject a liquid and an atomizing gas,
(Continued)

at least one outlet orifice (18) situated downstream of the first and second zones, for removing the atomized liquid from the body.

The internal wall (13) of the body is provided, between the zones (Z1) (Z2), with at least one chicane (20$_i$) configured so that, in each plane perpendicular to the longitudinal direction of the body containing the said chicane, this chicane extends over just part of the periphery of the internal wall (13).

10 Claims, 4 Drawing Sheets

(51) Int. Cl.
*B05B 7/04* (2006.01)
*C10G 11/18* (2006.01)

(56) References Cited

U.S. PATENT DOCUMENTS

| | | | | |
|---|---|---|---|---|
| 6,596,242 | B1 * | 7/2003 | Dries | B01J 8/008<br>422/139 |
| 2016/0288075 | A1 * | 10/2016 | Lacroix | B05B 1/044 |
| 2017/0043311 | A1 * | 2/2017 | Lesage | B01J 4/001 |

FOREIGN PATENT DOCUMENTS

| | | | |
|---|---|---|---|
| WO | 2015073133 | A1 | 5/2015 |
| WO | 2015170034 | A1 | 11/2015 |
| WO | 2017021977 | A1 | 2/2017 |

OTHER PUBLICATIONS

Prashanta Dutta et al., "Effect of baffle size, perforation, and orientation on internal heat transfer enhancement" International Journal of Heat and Mass Transfer., (1998), vol. 41, No. 19, pp. 3005-3013.

* cited by examiner

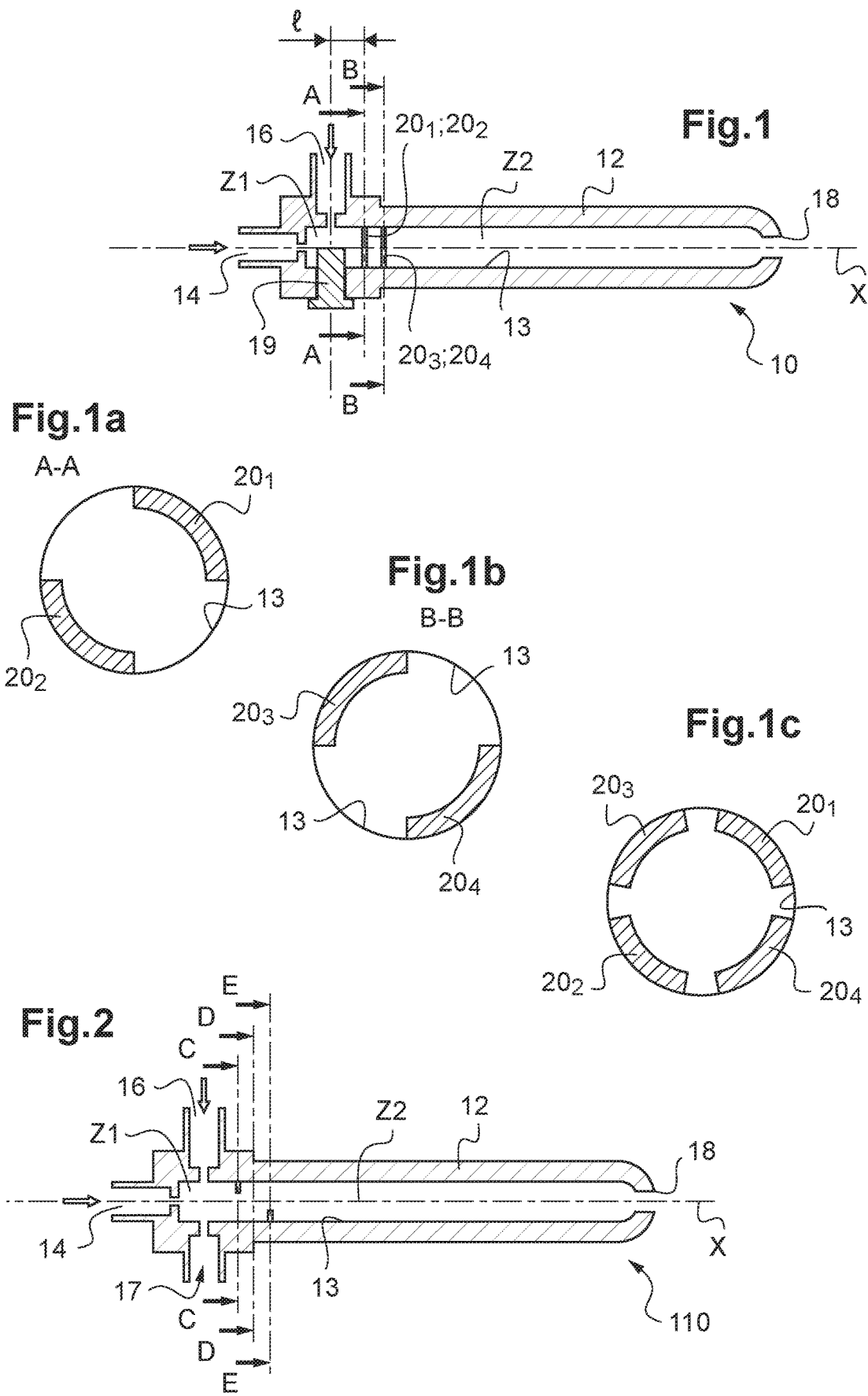

C-C

D-D

E-E

FCC UNIT CHARGE INJECTION DEVICE WITH LIMITED PRESSURE DROP

CROSS-REFERENCE TO RELATED APPLICATIONS

This application claims the benefit of PCT/EP2018/057340 filed Mar. 22, 2018, which claims priority from FR 1752496 filed Mar. 24, 2017, which are incorporated herein by reference in their entireties for all purposes.

The present invention relates to an injection device, notably to a hydrocarbon charge injection device for a refining unit, particularly a fluid catalytic cracking (FCC) unit.

The liquid hydrocarbon charges processed in refining units are generally brought into contact with a solid catalyst which will encourage the chemical reaction or reactions used to process the charge. In order to improve this contact and maximize the efficiency of the reactions, these liquid hydrocarbon charges are atomized into fine droplets by injection devices. This atomization makes it possible to maximize the area for contact between liquid (liquid hydrocarbon charge) and solid (catalyst), encouraging the transfer of heat and therefore encouraging the vaporization of these hydrocarbons which then react in a gaseous phase on contact with the solid (catalyst). Although there is no real consensus regarding the optimum diameter for the droplets, the desire is generally to form droplets the diameter of which is of the same order of magnitude as the diameter of the particles of catalyst, namely under 200 microns, for example of the order of 50 to 80 microns.

In general, use is made of injection devices referred to as "diphasic", which have a roughly cylindrical hollow body and two inlet openings via which the liquid hydrocarbon charge and an atomizing gas, generally steam, are respectively injected into the body. A contact chamber is formed inside the body, in which chamber the hydrocarbon charge and the atomizing gas are brought into contact in order to atomize the hydrocarbon charge. Once atomized, the hydrocarbon charge is ejected via an outlet opening that opens into the reactor. Each injection device is installed on a wall of the reactor so that one end of the injection device comprising the outlet opening is situated inside the reactor.

Impact-type injection devices are known, in which the charge is introduced into the body radially and impinges on a target situated at the centre of the body, causing droplets to form. An atomizing gas circulating axially allows these droplets to be entrained, dividing them further towards the outlet of the body. Document WO2015/073133A1 notably proposes an impact-type injection device in which a dispersion ring is placed inside the cylindrical body of the device, at the outlet of the contact chamber. This dispersion ring extends over the entire internal periphery of the body and redirects part of the peripheral axial stream of gas and droplets towards the inside of the body, making it easier for them to mix as they travel towards the outlet of the device. The reduction in the internal diameter of the body as a result of the presence of this ring does nevertheless cause a pressure drop which may prove to be problematical for processing heavy charges that are being increasingly used. Specifically, atomizing heavy charges, because of the physical properties (viscosity, density in particular) that these have, involves a significant pressure drop at the injectors in order to generate fine droplets, this having the effect of increasing the pressure of the charge fed to the injectors. It is then necessary to use powerful and expensive pumps in order to achieve the desired injector-outlet pressures. Depending on the configurations of the diphasic injection devices, it may also prove necessary to considerably increase the flow rate of atomizing gas in order to atomize heavy charges.

However, injecting increasing quantities of atomizing gas increases the overall cost of the processing operation and may also have a negative impact on the efficiency of the reactions by inducing undesired parallel reactions, notably when the atomizing gas is steam. So this is what happens when large quantities of steam are injected into FCC reactors. It is therefore preferable not to increase the flow rate of atomizing gas. Furthermore, injecting large quantities of steam requires oversizing of the effluent separation units downstream of the FCC unit, notably so as to condense the steam, thereby increasing the costs of manufacture. Moreover, operating at a lower pressure makes it possible to reduce the thicknesses of metal when manufacturing the charge preheating sequences upstream of the charge injection system, and therefore to reduce the costs of manufacture.

There is therefore a need for injection devices that give rise only to a small drop in injection pressure, allowing them to be used with heavy charges without the need to increase the flow rate of atomizing gas or the power of the pumps used.

The invention seeks to at least partially alleviate the disadvantages mentioned hereinabove. To this end it proposes an injection device configured to atomize a liquid into droplets using a gas, comprising a hollow tubular body extending in a longitudinal direction and of which an internal wall, notably a cylindrical wall, defines a first zone referred to as a contact zone and a second zone situated downstream of the first zone with respect to a direction in which the liquid and the gas circulate inside the body, the latter having:

at least a first and a second inlet opening opening into the said first zone, so as to respectively inject a liquid and an atomizing gas into the first zone, at least one outlet orifice situated downstream of the first and second zones, for removing the atomized liquid from the body.

According to the invention, the internal wall of the body is provided, between the first and the second zone, with at least one chicane configured so that, in each plane perpendicular to the longitudinal direction of the body containing the said chicane, this chicane extends over just part of the periphery of the internal wall.

In the usual way, a chicane is a device which impedes the passage of a moving fluid. Thus, according to the invention, in each plane perpendicular to the longitudinal direction of the body, each chicane reduces the through-area of the body on just part of its periphery so that the pressure drop is lower than the pressure drop that would arise if a chicane extended over the entire periphery of the internal wall as expected of the invention described in WO2015/073133A1.

What is meant by a through-area is the internal surface area of the body that is not occupied by an element and through which the fluid can circulate.

Advantageously, the said at least one chicane is configured in such a way that the orthogonal projection of the chicane onto a plane perpendicular to the longitudinal direction of the body extends over just part of the periphery of the internal wall in the said plane of projection. This makes it possible to reduce the pressure drop still further, despite the presence of (a) chicane(s). Note that when several chicanes are provided, their projections in one and the same orthogonal plane may overlap, or even extend over the entirety of the periphery of the internal wall.

As an alternative, or in combination, the said at least one chicane may be configured in such a way that the orthogonal projection of at least one chicane onto a plane perpendicular to the longitudinal direction of the body may extend over the entire periphery of the internal wall in the said plane of projection, possibly with overlap.

In one embodiment, the said internal wall may be provided with a plurality of disjointed chicanes. This makes it easier for the fluids to mix without thereby increasing the pressure drop. In particular, these chicanes may be distributed, particularly uniformly, on the periphery of the internal wall for better mixing without an increase in the pressure drop.

The features hereinafter also make it possible to improve the mixing between the liquid and the gas without appreciably increasing the pressure drop.

Thus, when there are several chicanes present, each chicane may advantageously be spaced away from at least one other chicane in the longitudinal direction of the body.

In that case, the chicanes may then extend over a relatively short length of the body.

When several spaced-apart chicanes are present, each chicane may also be angularly offset from the other chicanes by rotation about an axis parallel to or coincident with the said longitudinal direction. In particular, the orthogonal projection of the chicanes onto a plane perpendicular to the longitudinal direction of the body may extend over the entire periphery of the internal wall. In this plane of projection, there may be an overlap of the projections of the chicanes or, for preference, a juxtaposition thereof, the chicanes then being arranged in a staggered configuration.

Independently of the number of chicanes and layout thereof, the chicane or chicanes may have different shapes.

The said at least one chicane may thus define a wall one edge of which is secured to the internal wall along a line extending in a plane perpendicular to the longitudinal direction of the said body.

As an alternative, the said at least one chicane may define a wall one edge of which is secured to the internal wall along a segment of a curve, notably of a helicoidal curve.

In both instances, the wall defined by each chicane may then be a planar wall which is simple to produce, or else may be a curved wall.

The said at least one chicane may thus, on the side of the inlet openings, exhibit a curved face arranged to direct a fluid impinging on this face towards the inside of the body, which may make it possible to improve the mixing.

In particular, several chicanes having a curved face may be arranged relative to one another in such a way as to impart to the fluid impinging on the curved face thereof one and the same rotational movement about an axis parallel to the longitudinal direction of the body.

Whatever its shape (curved or planar), a chicane (or the tangent thereto at its point at which it meets the internal wall of the body) may define a predetermined angle with respect to a plane orthogonal to the longitudinal direction of the body. This angle may be variable for one and the same chicane.

Whatever the shape (curved or planar) of a chicane, its free edge (the edge opposite to its edge secured to the internal wall of the body) may have one or two faces of rounded or bevelled shape.

In general, the chicane or chicanes may have a height, measured perpendicular to the longitudinal direction of the body, that is non-zero. Advantageously, this height is equal at most to ½ of the maximum internal dimension of the body perpendicular to the longitudinal direction of the body. For preference, this height is equal at most to ¼ of the maximum internal dimension of the body, or even to $1/8^{th}$ of this maximum dimension, for example of the order of $1/10^{th}$ of this maximum dimension. This height may furthermore be variable for one and the same chicane.

In general, the chicane or chicanes may have a thickness, measured in the longitudinal direction of the body, that is non-zero. Advantageously, this thickness is at most 35 mm, preferably at most 31 mm, or even at most 20 mm or at most 16 mm. This thickness may for example be of the order of 10 mm.

The injection device according to the invention may be of various types.

It may notably be an injection device comprising a target extending perpendicular to the longitudinal direction of the body, facing a single liquid inlet opening of axis perpendicular to the longitudinal direction, or even an injection device comprising two liquid inlet openings extending perpendicular to the longitudinal direction of the body and situated facing one another, or even more than two openings the axes of which intersect at one single same point on an axial line extending inside the body in the longitudinal direction X, as described in document FR 3 020 578 A1.

The invention is now described with reference to the appended, non-limiting drawings, in which:

FIG. 1 is a schematic depiction in longitudinal section of an injection device according to one embodiment of the invention;

FIGS. 1a and 1b are views in section on the lines AA and BB of FIG. 1, respectively;

FIG. 1c is an orthogonal projection in a plane perpendicular to the longitudinal direction X of the chicanes of the injection device of FIG. 1, according to an alternative form of embodiment;

FIG. 2 is a schematic depiction in longitudinal section of an injection device according to another embodiment of the invention;

Figure 3:
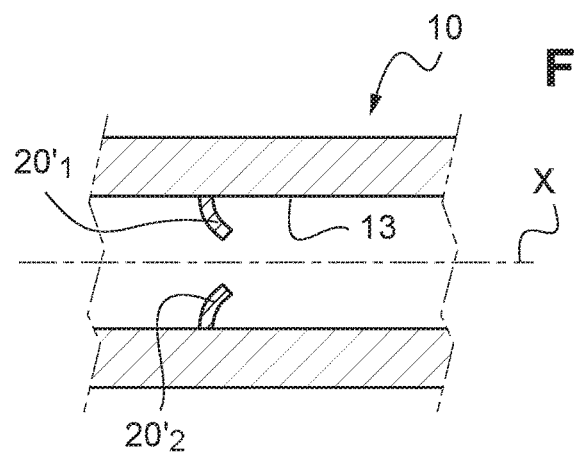
Figure 4:
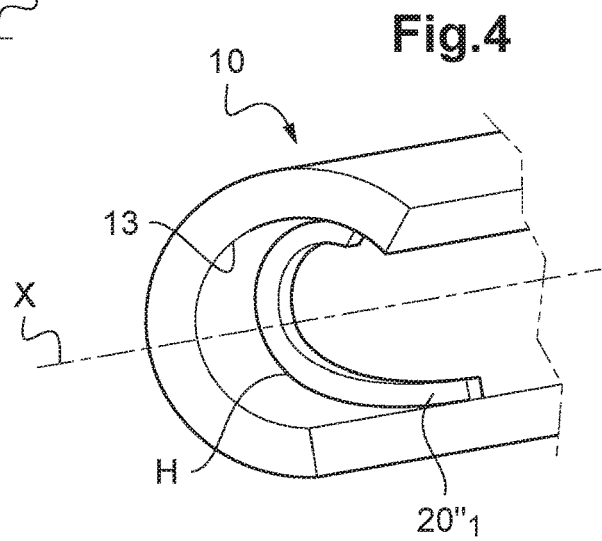
Figure 5:
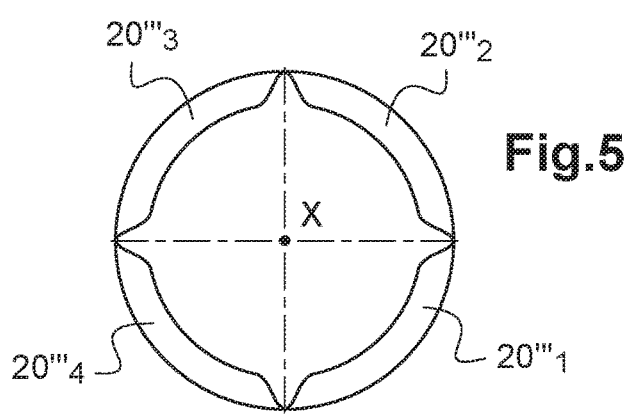
Figure 6:
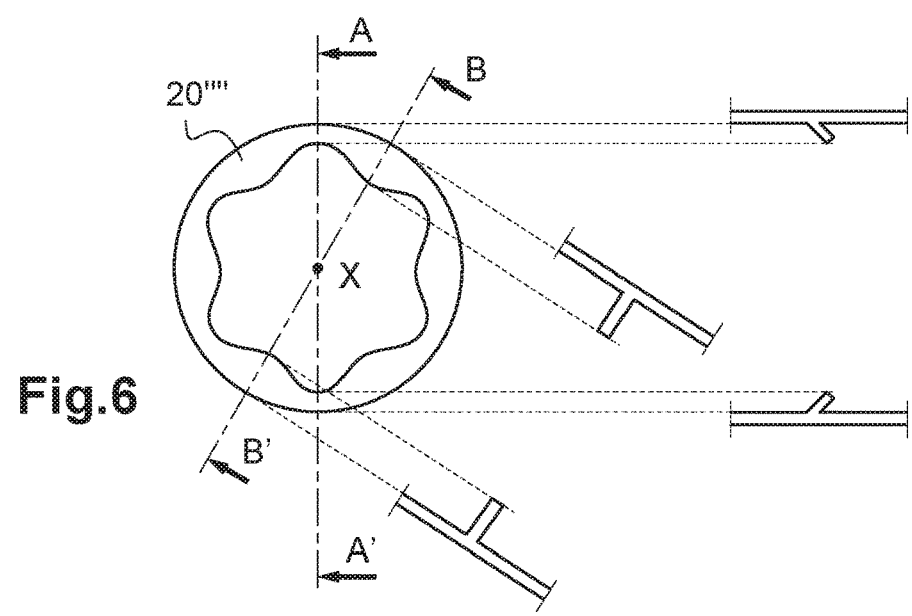
Figure 7:
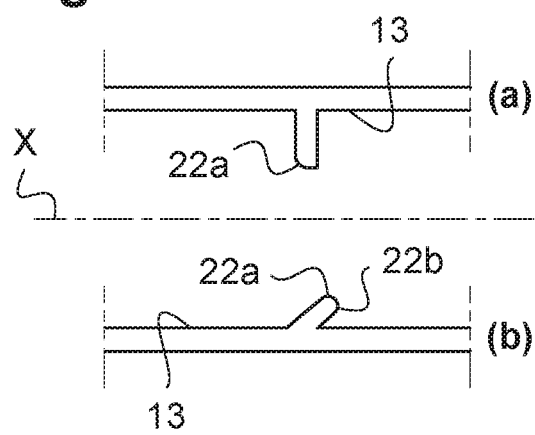
Figure 8:
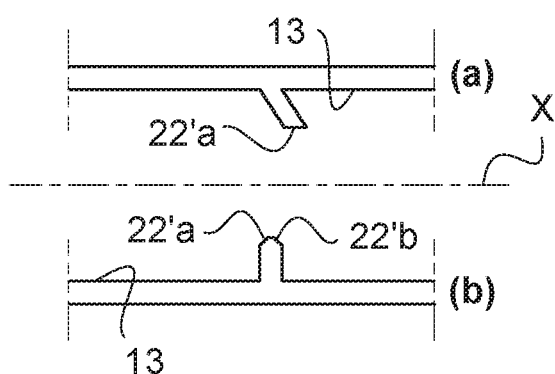

FIG. 3 partially depicts a longitudinal section of an injection device according to another alternative form;

FIG. 4 partially depicts a perspective view of the open internal wall of an injection device according to another alternative form;

FIG. 5 depicts a view of several chicanes along the longitudinal axis X according to another alternative form;

FIG. 6 depicts a view along the longitudinal axis X according to another alternative form of one single same chicane, and views in section in two distinct directions A'A and B'B which are perpendicular to the longitudinal direction;

FIGS. 7 and 8 partially depict views in longitudinal section of chicanes having free edges of different shapes.

In the various figures, elements that are identical bear the same references.

FIG. 1 schematically depicts an injector 10 which has a hollow tubular body 12, in this instance essentially cylindrical, which extends in a longitudinal direction X.

The body 12 comprises an internal wall 13 which defines a first zone Z1 referred to as a contact zone, and a second zone Z2 situated downstream of the first zone Z1 with respect to a direction in which the liquid and the gas circulate inside the body (in this instance from left to right in the figure).

This hollow body 12 also has:
- a first gas inlet opening 14, intended to be connected to a gas supply pipe,
- a second, liquid inlet opening 16, intended to be connected to a liquid supply pipe,
- an outlet orifice 18 for discharging the atomized liquid, which is situated downstream of the zones Z1, Z2.

The openings 14 and 16 open into the first zone Z1, also referred to as the contact chamber.

Inside the body 12, the fluids circulate from the inlet openings 14, 16 towards the outlet orifice 18.

The injector 10 depicted in FIG. 1 is commonly referred to as being of the "impact" type.

Here, the first zone Z1 and the second zone Z2 both take the form of a straight internal duct connecting the first inlet opening 14 to the outlet orifice 18 in an axial direction of the said body. This internal duct has an internal diameter that is substantially constant. In other words, the internal wall 13 is cylindrical in this instance, its axis coinciding with the longitudinal direction X of the body.

The injection device 10 further comprises a target 19 extending in projection from the internal wall 13 in the first zone Z1, facing the liquid introduction opening 16 and through the passage of the gas entering via the opening 14.

The liquid is sprayed against the target 19 as soon as it enters the first zone Z1 via the opening 16. The jet of liquid is broken open and carried in the form of droplets by a stream of atomizing gas introduced at high speed through the opening 14. The atomization of the liquid in this type of injector 10 takes place in two stages. A first part of the atomization occurs at the target 19 as the jet of liquid is broken open. The second part of the atomization occurs at the reduced-diameter outlet orifice 18, where the narrowing in diameter accelerates the fluids.

According to the invention, the internal wall 13 of the body is provided, between the first zone Z1 and the second zone Z2, with at least one chicane $20_i$ (where i, the number of chicanes, is a non-zero whole number) configured so that, in each plane perpendicular to the longitudinal direction X of the body containing the said chicane, this chicane extends over just part of the periphery of the internal wall. Because this chicane locally reduces the diameter of the internal wall 13, it disrupts the movement of the fluid, encouraging mixing. In particular, the presence of the chicane makes it possible to avoid the formation of a film of liquid on the wall by bringing the liquid back into the axis of the stream of gas.

In the example of FIG. 1, four disjointed chicanes $20_1$, $20_2$, $20_3$, $20_4$ are provided.

It will be noted here that each chicane $20_1$, $20_2$, $20_3$, $20_4$ is configured in such a way that the orthogonal projection of the chicane onto a plane perpendicular to the longitudinal direction of the body extends over just part of the periphery of the internal wall in the said plane of projection (see FIGS. 1a, 1b).

Two chicanes $20_1$, $20_2$ extend in one and the same plane perpendicular to the longitudinal direction X, the other two chicanes $20_3$, $20_4$ extending in another perpendicular plane, spaced away from the plane of the chicanes in the longitudinal direction X.

The chicanes $20_1$, $20_2$, $20_3$, $20_4$ are furthermore offset angularly by rotation about the longitudinal direction X, as visible in FIGS. 1a and 1b. It will be noted that these chicanes are in a staggered configuration, their orthogonal projection onto a plane perpendicular to the longitudinal direction of the body extending over the entire periphery of the internal wall 13.

As an alternative that has not been depicted, provision could be made for the orthogonal projection of these chicanes onto a plane perpendicular to the direction X not to extend over the entire periphery of the internal wall 13 but to extend over just part, as depicted in FIG. 1c.

In another alternative form that has not been depicted, provision could be made for the orthogonal projection of the chicanes onto a plane perpendicular to the direction X to extend over the entire periphery of the internal wall 13, with the projections of the chicanes overlapping.

Thus, the relative layout of the chicanes may be chosen in such a way as to cause as much disruption as possible to the movement of the fluid circulating inside the injection device, without increasing the drop in pressure.

In the example depicted in FIG. 1, the chicanes take the form of planar walls perpendicular to the longitudinal direction X. In other words, one edge of the wall of each chicane is thus secured to the internal wall 13 along a line extending in a plane perpendicular to the longitudinal direction of the said body.

FIG. 2 depicts an injection device 10 which differs from the embodiment depicted in FIG. 1 only in that the target 19 is replaced by an opening 17 intended to be connected to a liquid duct.

This injection device 10 is also of the "impact" type, but the jet of liquid impinges not on a target but on another jet of liquid. Thus, the openings 16 and 17 are positioned facing one another, perpendicular to the longitudinal direction X, so that the jets of liquid leaving them impinge on one another inside the first zone Z1, substantially facing the gas inlet opening 14. A configuration of the openings as described in document FR 3 020 578 A1 could also be considered.

FIGS. 2 to 8 depict other embodiments which differ from those previously described in terms of the number and/or shape of the chicanes. In these figures, the chicanes are denoted by the reference "20", the suffix "i", which is a non-zero whole number, representing the number of chicanes, the symbols prime ('), double prime ("), triple prime ('") and quadruple prime ("") denoting embodiments that differ from those previously described.

Figure 2A:
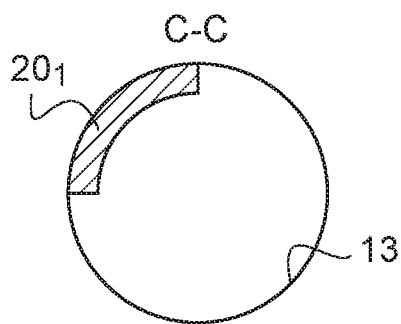
FIGS. 2a, 2b and 2c are views in section on the lines CC, DD and EE of FIG. 2, respectively.
Figure 2B:
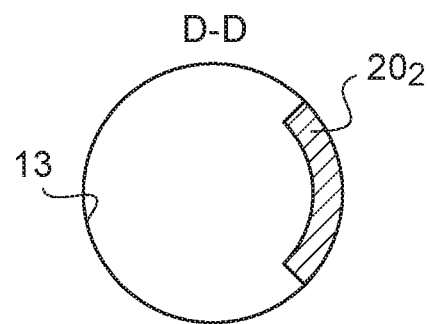
Figure 2C:
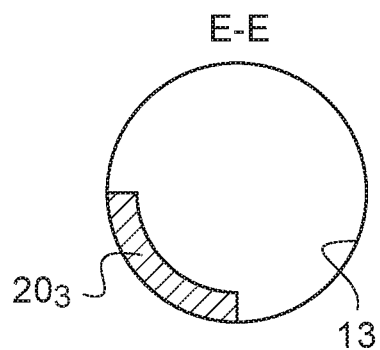

In the embodiment of FIG. 2, the injection device 10 is equipped here with three chicanes $20_1$, $20_2$, $20_3$ spaced apart in the longitudinal direction X and angularly offset (see FIGS. 2a, 2b, 2c).

The chicanes depicted in FIGS. 1 and 2 define planar walls perpendicular to the longitudinal direction X. These walls could also be curved. Thus, FIG. 3 is a partial depiction in axial section of the injection device 10 provided with chicanes $20'_1$, $20'_2$ that are curved, notably in the direction of the central longitudinal axis of the body 12. Here, the concavity of these chicanes is orientated towards the outlet orifice 18. Nevertheless, provision could be made for it to be orientated in the opposite direction.

In this embodiment, each chicane $20'_1$, $20'_2$ defines a wall, one edge of which is secured to the internal wall 13 along a line extending in a plane perpendicular to the longitudinal direction X. Although not depicted, other chicanes $20'_i$ spaced apart in the X-direction and/or angularly offset from one another could be provided.

FIG. 4 is a partial perspective depiction of the wall 13 of an injection device 10 comprising a chicane $20''_1$ which defines a wall one edge of which is secured to the internal wall 13 along a segment of a helicoidal curve H. The chicane $20''_1$ may define a planar or curved wall, as depicted in FIG. 1c. In the example, the segment of a helicoidal curve does not make a complete circuit of the body. Nevertheless, provision could be made for it to make a complete circuit thereof, or even for it to make more than one complete circuit thereof.

One or more chicanes $20'''_i$ may be provided, these for example being angularly offset and/or spaced apart in the longitudinal direction X. Furthermore, they may be arranged relative to one another in such a way as to impart to the fluid impinging on the curved face thereof one and the same rotational movement about an axis parallel to the longitudinal direction of the body.

The chicanes described hereinabove may be produced as one-piece with the body 12, for example by moulding or machining, or may be added-on elements which are fixed, for example welded, held between flanges, or the like. When several chicanes are present, they may be identical or different, it being possible to combine the various shapes and arrangements of chicanes described hereinabove.

The chicane or chicanes are arranged between the first and second zones Z1, Z2. Typically, the second zone has a length (in the longitudinal direction X) 2 to 10 times greater than the length of the first zone. The chicane or chicanes, notably the first chicane, may be situated at a distance "l" from the axis or the target 19 or the openings 16, 17 that is less than the diameter of the internal wall 13, at the level of the first zone, for example at a distance corresponding to ¾ of this diameter (for the sake of clarity, the figures are not drawn to scale).

The chicane or chicanes may have a non-zero radial dimension or height (perpendicular to the longitudinal direction X) that is relatively small, for example less than $\frac{1}{8}^{th}$ of the diameter of the internal wall 13, or even of the order of $\frac{1}{10}^{th}$ of this diameter. This height may be variable along the length of a chicane, as depicted in FIG. 5, in which four chicanes $20'''_1$, $20'''_2$, $20'''_3$, $20'''_4$ are depicted, with their height varying at the ends.

The non-zero thickness of each chicane, measured in the longitudinal direction X of the body, is, for example, at most 16 to 35 mm.

It will be noted that, whatever its shape (curved or planar), a chicane (or the tangent thereto at its point at which it meets the internal wall 13 of the body) may define a predetermined angle with respect to a plane orthogonal to the longitudinal direction of the body (see FIGS. 3, 6, 7(*b*) and 8(*a*)). This angle may be variable for one and the same same chicane $20'''$, as visible in FIG. 6.

The chicane or chicanes inclined in this way may be inclined in the direction of the outlet orifice 18.

Whatever its shape (curved or planar), the free edge of a chicane (the opposite edge to the edge secured to the internal wall of the body) may have a face 22*a* of rounded shape (FIG. 7(*a*)), a face 22'*a* that is bevelled (FIG. 7(*b*)), two faces 22*a*, 22*b* with rounded shapes (FIG. 8(*a*)) or two faces 22'*a*, 22'*b* with a bevelled shape (FIG. 8(*b*)).

When just one face is provided, this may be situated on the side of the mixing zone Z1 in the longitudinal direction X, as depicted.

The various embodiments described hereinabove may be combined and implemented with equal preference for one or several chicanes.

The invention claimed is:

1. An injection device configured to atomize a liquid into droplets using a gas, comprising:
    a hollow tubular body extending in a longitudinal direction (X) and of which an internal wall defines a first zone referred to as a contact zone (Z1) and a second zone (Z2) situated downstream of the first zone with respect to a direction in which the liquid and the gas circulate inside the body, the latter having:
    at least a first and a second inlet opening opening into the said first zone (Z1), so as to respectively inject a liquid and an atomizing gas into the first zone,
    at least one outlet orifice situated downstream of the first and second zones, for removing the atomized liquid from the body,
    wherein the internal wall of the body between the contact and the second zone comprises a plurality of chicanes configured so that, in each plane perpendicular to the longitudinal direction of the body containing the plurality of chicanes, wherein the plurality of chicanes extends over at least a quarter of the periphery of the internal wall, wherein the internal wall between the contact zone and the second zone take the form of a straight internal duct.

2. The injection device of claim 1, characterized in that the internal wall is provided with a plurality of disjointed chicanes.

3. The injection device of claim 2, characterized in that each chicane is spaced away from at least one other chicane in the longitudinal direction of the body.

4. The injection device of claim 2, characterized in that each chicane is angularly offset from the other chicanes by rotation about an axis parallel to or coincident with the said longitudinal direction (X).

5. The injection device of claim 4, characterized in that the orthogonal projection of the chicanes onto a plane perpendicular to the longitudinal direction of the body extends over the entire periphery of the internal wall, with the projections overlapping or juxtaposed.

6. The injection device of claim 1, characterized in that the chicanes have a height, measured perpendicular to the longitudinal direction of the body, that is non-zero and equal at most to ½ of the maximum internal dimension of the body perpendicular to the longitudinal direction of the body.

7. The injection device of claim 1, characterized in that the plurality of chicanes defines a wall one edge of which is secured to the internal wall along a line extending in a plane perpendicular to the longitudinal direction of the said body.

8. The injection device of claim 1, characterized in that the plurality of chicanes define a wall one edge of which is secured to the internal wall along a segment of a curve, notably of a helicoidal curve.

9. The injection device of claim 1, characterized in that it comprises a target extending perpendicular to the longitudinal direction of the body, facing a single liquid inlet opening of axis perpendicular to the longitudinal direction (X).

10. The injection device of claim 1, characterized in that it comprises two liquid inlet openings extending perpendicular to the longitudinal direction of the body and situated facing one another.

* * * * *